US012644828B2

(12) United States Patent
Mimeault et al.

(10) Patent No.: US 12,644,828 B2
(45) Date of Patent: Jun. 2, 2026

(54) SPECTROMETER SYSTEMS AND METHODS OF REMOTE DATA ACQUISITION FOR DETECTING CHEMICAL COMPOSITIONS

(71) Applicant: ABB Schweiz AG, Baden (CH)

(72) Inventors: Yvan Mimeault, Quebec City (CA); Sylvio Laplante, Quebec City (CA)

(73) Assignee: ABB Schweiz AG, Baden (CH)

( * ) Notice: Subject to any disclaimer, the term of this patent is extended or adjusted under 35 U.S.C. 154(b) by 141 days.

(21) Appl. No.: 18/443,040

(22) Filed: Feb. 15, 2024

(65) Prior Publication Data

US 2025/0264403 A1     Aug. 21, 2025

(51) Int. Cl.
*G01N 21/31* (2006.01)

(52) U.S. Cl.
CPC ......... *G01N 21/31* (2013.01); *G01N 2201/08* (2013.01)

(58) Field of Classification Search
CPC .......... G01J 3/0218; G01J 3/0297; G01J 3/45; G01N 2021/0118; G01N 2021/0156; G01N 2021/3595; G01N 21/31; G01N 2201/08
See application file for complete search history.

(56) References Cited

U.S. PATENT DOCUMENTS

| | | |
|---|---|---|
| 7,460,232 B2 | 12/2008 | Buijs |
| 8,014,965 B2 | 9/2011 | Desbiens |
| 8,630,314 B2 | 1/2014 | York |
| 9,007,591 B2 | 4/2015 | Arimoto et al. |

| | | | |
|---|---|---|---|
| 9,784,601 B2 | 10/2017 | Willis | |
| 9,964,396 B1 * | 5/2018 | Scott .................. | G01B 9/02051 |
| 2009/0236528 A1 * | 9/2009 | Shpantzer ................ | G01J 3/02 |
| | | | 356/301 |
| 2011/0188042 A1 | 8/2011 | Belz | |
| 2016/0011523 A1 * | 1/2016 | Singh ................. | G01N 21/4788 |
| | | | 355/77 |

FOREIGN PATENT DOCUMENTS

| | | |
|---|---|---|
| EP | 4141417 A1 | 3/2023 |
| WO | 2019/191698 A2 | 10/2019 |

OTHER PUBLICATIONS

International Search Report and Written Opinion for Application No. PCT/EP2025/054047, dated Jun. 6, 2025, 18 pages.

(Continued)

*Primary Examiner* — Hina F Ayub

(74) *Attorney, Agent, or Firm* — McCarter & English, LLP

(57) ABSTRACT

A spectrometer system for remote data acquisition in detecting chemical compositions of a sample is provided. The spectrometer system includes an analyzer including an interferometer configured to modulate light. The spectrometer system further includes a sampler positioned remotely from the analyzer and connected with the interferometer via a fiber optic cable. The fiber optic cable is configured to transmit modulated light from the interferometer to the sampler. The sampler includes an optical detector positioned adjacent to a sampling module. The sampling module is configured to receive a sample and configured to position the sample in an optical path of the modulated light. The optical detector is configured to detect modified light by the sample. The sampler also includes an interface module configured to transmit detected signals by the optical detector to the analyzer.

20 Claims, 6 Drawing Sheets

200

(56) References Cited

OTHER PUBLICATIONS

Primera-Pedrozo et al., High Explosives Mixtures Detection Using Fiber Optics Coupled: Grazing Angle Probe/Fourier Transform Reflection Absorption Infrared Spectroscopy. Sens Imaging. 2008;9:27-40.

Invitation to Pay Additional Fees for Application No. PCT/EP2025/054047, dated Apr. 16, 2025, 12 pages.

* cited by examiner

100

200

200-5

Analyzer Enclosure 204

600

Transmit, to a sampler, light modulated by an interferometer — 602

Position a sample in a sampling module of the sampler and in an optical path of the modulated light — 604

Position an optical detector of the sampler — 606

Detect, by the optical detector, light modified by the sample — 608

Transmit detected signals to the analyzer — 610

SPECTROMETER SYSTEMS AND METHODS OF REMOTE DATA ACQUISITION FOR DETECTING CHEMICAL COMPOSITIONS

BACKGROUND

The field of the disclosure relates generally to spectrometers, and more particularly, to spectrometer systems and methods for detecting chemical compositions.

A spectrometer has been used in detecting chemical compositions of a sample in a broad range of applications, such as semiconductor microchip fabrication and detection of contaminants in fuel gas production. In a spectrometer, a light is emitted from a light source and then modulated by an interferometer. The modulated light is emitted toward a sample. Chemical components of the sample absorb the light with absorption spectra specific to the chemical components, thereby facilitating the use of the light modified by the sample for detecting the chemical compositions of the sample. Known systems and methods are disadvantaged in some aspects in meeting the needs for the accuracy of measurements and improvements are desired.

BRIEF DESCRIPTION

In one aspect, a spectrometer system for remote data acquisition in detecting chemical compositions of a sample is provided. The spectrometer system includes an analyzer including an interferometer configured to modulate light. The spectrometer system further includes a sampler positioned remotely from the analyzer and connected with the interferometer via a fiber optic cable. The fiber optic cable is configured to transmit modulated light from the interferometer to the sampler. The sampler includes an optical detector positioned adjacent to a sampling module. The sampling module is configured to receive a sample and configured to position the sample in an optical path of the modulated light. The optical detector is configured to detect modified light by the sample. The sampler also includes an interface module configured to transmit detected signals by the optical detector to the analyzer.

In another aspect, a method of remotely acquiring data using a spectrometer system for detecting chemical compositions of a sample is provided. The method includes transmitting, to a sampler, light modulated by an interferometer of an analyzer in a spectrometer system. The sampler is positioned remotely from the analyzer. The method also includes positioning a sample in a sampling module and in an optical path of the modulated light, and positioning an optical detector of the sampler adjacent to the sampling module and in an optical path of light exiting from the sampling module. The method further includes detecting, by the optical detector, light modified by the sample, and transmitting, via an interface module of the sampler, detected signals to the analyzer.

In one more aspect, a sampler of a spectrometer system for detecting chemical compositions of a sample is provided. The sampler includes an optical detector positioned adjacent to a sampling module and in an optical path of light exiting from the sampling module. The sampling module is configured to receive a sample and configured to position the sample in an optical path of light modulated by an interferometer such that the modulated light travels through the sample and is modified by the sample. The optical detector is configured to detect the modified light by the sample. The sampler further includes an interface module configured to transmit detected signals by the optical detector to an analyzer positioned remotely from the sampler.

BRIEF DESCRIPTION OF DRAWINGS

These and other features, aspects, and advantages of the present disclosure will become better understood when the following detailed description is read with reference to the accompanying drawings in which like characters represent like parts throughout the drawings.

DETAILED DESCRIPTION

The disclosure includes spectrometer systems and methods for detecting chemical compositions of a sample. The sample may be in any state such as solid, liquid, gaseous, other states, or any combination thereof. Method aspects will be in part apparent and in part explicitly discussed in the following description.

In a spectrometer system, a light is emitted from a light source. The light may be in the range of far infrared (FIR), mid infrared (IR), near IR, visible, and/or ultraviolet (UV) light. The light is modulated by an interferometer, which typically includes a sliding mirror that moves in a pattern needed for an application. The movement modulates the light. The modulated light is then emitted toward a sample. Different chemical components absorb light with different absorption spectra, where each absorption spectrum is specific to a chemical component. Therefore, light modified by the sample may be used to determine the chemical compositions of the sample by detecting the modified light and processing the detected signals. Fourier transform may be used to process the signals in deriving the absorption spectra of the sample.

Figure 1:
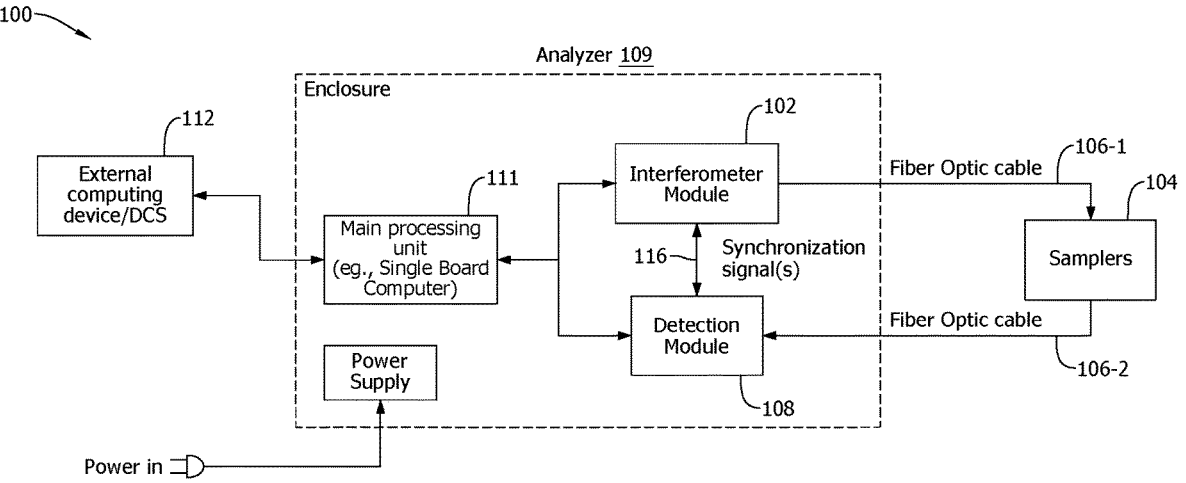
FIG. 1 is a schematic diagram of a known spectrometer system.

FIG. 1 is a schematic diagram of a known spectrometer system 100. In known spectrometer system 100, light is modulated by an interferometer module 102 that includes an interferometer configured to modulate light. The modulated light is transmitted to a sampler 104 via a fiber optic cable 106-1. The light travels through a sample positioned in sampler 104 and exits from sampler 104. The light exiting from sampler 104 is modified by the sample. The modified light is transmitted back to a detection module 108 in an analyzer 109 via another fiber optic cable 106-2. Detection module 108 detects the modified light and processes the detected signals. For example, the detected signals are converted to digital signals. The processed signals are transferred to a main processing unit 111 and/or an external computing device 112 for further processing, such as determining the absorption spectra of the sample and chemical compositions of the sample based on the absorption spectra. Sampler 104 is typically positioned remotely from analyzer 109. For example, sampler 104 is coupled with a conduit section of a process line in a processing plant, which is typically remote from the analyzer with a distance of meters or even hundreds of meters from the analyzer. To cover that distance with optical fiber may become expensive. Further, due to the temperature changes, bending, optical vibration, or other factors of optical fiber, noise and/or spectral distortion is introduced to the light. As a result, light received at the sampler is different from the light exiting from interferometer module 102, and light received at detection module 108 is different from the light exiting from sampler 104, compromising the accuracy of measurements.

In data acquisition and processing, the accurate positions of the sliding mirror are needed to differentiate acquired signals of modified light by the sample to correspond to specific positions of the sliding mirror. A reference light, typically in a monochromatic spectrum, is used to determine the positions. The reference light is generated by a monochromatic light source such as a laser. The reference light travels approximately in parallel with the measurement light in the system. The signals of the reference light are used to determine the positions of the sliding mirror.

Interferometer module 102 and digitization in detection module 108 need to be synchronized in order to use the reference light to determine the accurate positions of the sliding mirror in interferometer module 102 and therefore to produce detected signals corresponding to specific positions of the sliding mirror. In known spectrometer system 100, a synchronization cable 116 is needed, where synchronization cable 116 connects interferometer module 102 with detection module 108. Synchronization signals, such as electrical pulses indicating the timing, are sent via synchronization cable. The synchronization signals are used to determine the positions of the sliding mirror in the detected signals acquired by detection module 108.

Systems and methods described herein solve the above-described problems in at least some known systems. Spectrometer systems described herein integrate detection modules into samplers. As a result, the need of the return fiber optic cables that extend from the samplers to the detection modules in at least some known systems is eliminated, thereby reducing the costs of the systems in fiber optic cables and increasing the accuracy of measurements by eliminating the noise caused by the return fiber optic cables. In some embodiments, an optical detector reference module is included in a spectrometer system to remove or reduce the noise caused by the fiber optic cable extending from the interferometer and the sampler, further increasing the accuracy of measurements. In addition, a synchronization cable may be eliminated in the systems and methods described herein. Synchronization signals may be derived via software, thereby reducing costs from a synchronization cable while facilitating the integration of a detection module into a sampler and remote data acquisition by a spectrometer system.

Figure 2:
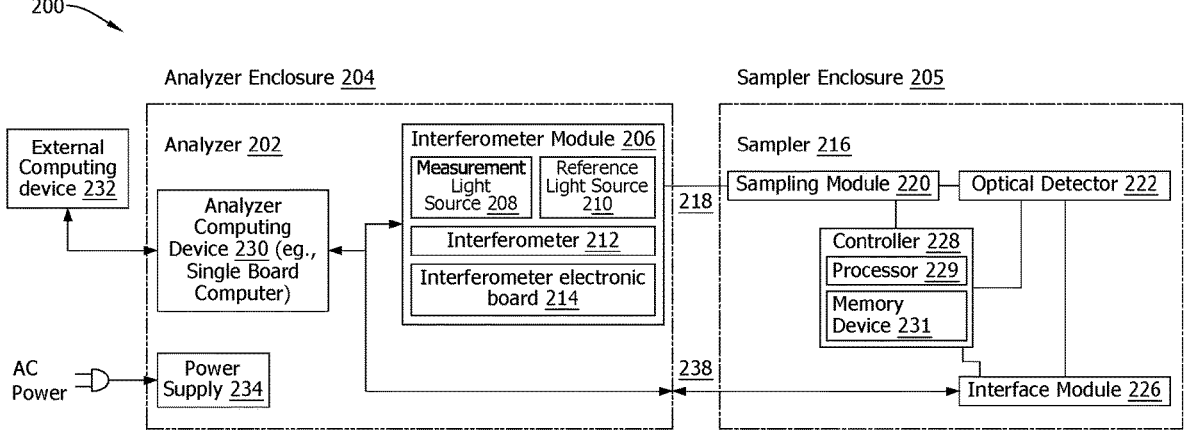
FIG. 2 is a schematic diagram of an example spectrometer system.

FIG. 2 is a schematic diagram of an example spectrometer system 200. In the example embodiment, spectrometer system 200 includes an analyzer 202. In the depicted embodiments, analyzer 202 includes an analyzer enclosure 204 that contains other components of analyzer 202. Alternatively, at least some components of analyzer 202 are assembled into separate units. Analyzer 202 further includes an interferometer module 206. Interferometer module 206 includes a measurement light source 208 configured to emit light for measurements of the sample. The light may be in any bandwidth. In some embodiments, the light has a relatively broad spectrum such as in the spectra of IR light, visible light, and/or UV light. Interferometer module 206 also includes a reference light source 210 such as a laser generator. Reference light source 210 is configured to emit light having a monochromatic spectrum. Interferometer module 206 further includes an interferometer 212. Light emitted from measurement light source 208 and a reference light from reference light source 210 are modulated by interferometer 212. For example, movement of a sliding mirror (not shown) in interferometer 212 modulates the measurement light and the reference light.

In the example embodiments, interferometer module 206 further includes an interferometer electronic board 214 configured to control operation of interferometer module 206. For example, interferometer electronic board 214 is configured to control the operation of interferometer 212, and/or the light generation of measurement light source 208 and/or reference light source 210. Interferometer electronic board 214 may include a microcontroller.

In the example embodiments, analyzer 202 further includes an analyzer computing device 230. Analyzer computing device 230 may be a single board computing device. Alternatively, analyzer computing device 230 is a computing device having a plurality of electronic boards. Analyzer computing device 230 is configured to communicate with an external computing device 232, which is configured to further process signals acquired by a sampler 216. External computing device 232 may be a user computer device or a server computing device such as a cloud computing device. Analyzer computing device 230 communicates with external computing device 232 via wired communication such as Ethernet or via wireless communication such as wireless local area network (LAN).

In the example embodiments, analyzer 202 further includes a power supply 234. Power supply 234 is configured to receive power from an external power source. Power supply 234 may include one or more converters (not shown) configured to convert the external power to supply power at a desired range of voltage, current, and/or power levels.

In the example embodiments, spectrometer system 200 further includes sampler 216. One sampler 216 is depicted as an example for illustration purposes only. A plurality of samplers 216 (see FIG. 5 described later) may be included in spectrometer system 200. Sampler 216 is connected with interferometer 212 via a fiber optic cable 218.

In the depicted embodiments (also see FIGS. 3-5 described later), sampler 216 includes a sampling module 220 configured to receive a sample. In some embodiments, sampler 216 does not include sampling module 220. Sampling module 220 may be positioned separate from and/or outside of sampler enclosure 205. In operation, sampler 216 is coupled with sampling module 220 by positioning sampler 216 onto sampling module 220. For example, sampler 216 is coupled with sampling module 220 by clipping sampler 216 onto tubing 302 (see FIG. 3). Modulated light from interferometer 212 is transmitted via fiber optic cable 218 and emitted toward the sample contained in sampling module 220.

In the example embodiment, sampler 216 further includes an optical detector 222. One or more optical devices such as lenses may be provided to focus the light into sampling module 220 and/or optical detector 222. Optical detector 222 is positioned adjacent to sampling module 220 such that light exiting from sampling module 220 enters into optical detector 222 directly or after being directed by one or more optical devices such as mirrors or lenses. Optical detector 222 is integrated into sampler 216 such that a fiber optic cable is not needed to transmit light modified by the sample to optical detector 222 for detection. In the depicted embodiment, sampling module 220, optical detector 222, and other components such as a controller 228 and an interface module 226 are assembled inside one sampler enclosure 205. Alternatively, at least some components of sampler 216 are assembled into separate units. Signals detected by optical detector 222 may be processed such as being amplified and/or digitized in sampler 216.

In the example embodiments, sampler 216 further includes interface module 226 configured to communicate with another device, such as analyzer 202. Interface module 226 may include a network interface, which is configured to connect sampler 216 to a computer network. The network interface is sized to receive a networking cable 238. For example, the network interface may be an Ethernet interface sized to receive an Ethernet cable. Alternatively or additionally, the network interface may include a wireless communication port. Sampler 216 may communicate with analyzer 202 via a wired communication mechanism such as via Ethernet. Alternatively or additionally, sampler 216 may communicate with analyzer 202 via a wireless communication mechanism such as through wireless LAN like Wi-fi®.

In the depicted embodiments, spectrometer system 200 may include one or more networking cables 238 (also see FIGS. 3 and 4 described later) connecting analyzer 202 with sampler 216. Networking cable 238 may be an Ethernet cable. Networking cable 238 may be a Power over Ethernet (PoE) cable configured to supply electric power and serve communication purposes via the same cable. A PoE cable complies with the PoE standards. In some embodiments, networking cable 238 may be a cable complying with Ethernet Advanced Physical Layer (APL), where the cable includes a physical layer for Ethernet communication and supply of power with protected measures for safe use in hazardous areas. Networking cable 238 complying with Ethernet APL standards is configured to be used in a hazardous environment.

Communication between analyzer 202 and sampler 216 via a networking cable 238 is depicted as example for illustration purposes only. Communication between analyzer 202 and sampler 216 may be wireless.

In the example embodiments, sampler 216 further includes a controller 228. Controller 228 is configured to control the operations of sampler 216. For example, controller 228 sends control signals to other components in sampler 216, such as sampling module 220, optical detector 222, and/or interface module 226, and controls the operations of sampler 216. Signals detected by optical detector 222 or received by interface module 226 may be transferred to controller 228, where controller 228 may adjust the controls based on the signals.

In the example embodiments, controller 228 includes a processor-based microcontroller including a processor 229 and a memory device 231 wherein executable instructions, commands, and control algorithms, as well as other data and information needed to satisfactorily operate spectrometer system 200 and sampler 216, are stored. Memory device 231 may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based" microcontroller shall refer not only to controller devices including a processor or microprocessor as shown, but also to other equivalent elements such as microcomputers, programmable logic controllers, reduced instruction set circuits (RISC), field programmable gate arrays (FPGA), application specific integrated circuits and other programmable circuits, logic circuits, equivalents thereof, and any other circuit or processor capable of executing the functions described herein. The processor-based devices listed above are exemplary only, and are thus not intended to limit in any way the definition and/or meaning of the term "processor-based."

In operation, light modulated by interferometer 212 travels along fiber optic cable 218 to sampling module 220. The modulated light then travels through the sample in sampling module 220. The light exiting from sampling module 220 is modified by the chemicals in the sample. The modified light is detected and converted into electrical signals by optical detector 222. The electrical signals may be processed and digitized into digital signals by optical detector 222. The digital signals may be transmitted to analyzer 202 via the communication channels between sampler 216 and analyzer 202. Analyzer 202 may further process the signals. In some embodiments, analyzer 202 relays signals received from sampler 216 without processing. Analyzer 202 is in communication with external computing device(s) 232, which is configured to process and analyze the signals and determine the chemical compositions of the sample based on the analysis.

In known spectrometer system 100, light modified by a sample is transmitted via a fiber optic cable to detection module 108. In contrast, in spectrometer system 200, modified light enters into optical detector 222 positioned adjacent to sampling module 220, thereby eliminating the return fiber optic cable and noise caused by the fiber optic cable due to factors such as temperature changes, optical vibration, bending of the optical fiber, and/or other changes in the optical fiber. Accordingly, eliminating a return fiber optic cable increases accuracy of measurements, and reduces costs of a spectrometer system. Integrating an optical detector into a sampler also simplifies the design of spectrometer system 200 and reduces the number of optical components in the system.

In the example embodiments, the synchronization between interferometer 212 and optical detector 222 may be accomplished via software, thereby eliminating the synchronization cable in known spectrometer systems. As used herein, in synchronizing two or more devices via software, synchronization signals are digital signals and are derived based on digital signals by a software program used to process the digital signals and derive synchronization signals. The digital signals for synchronization may be clock signals and/or communication signals of spectrometer system 200. Synchronization via software may achieve a precision within several nanoseconds.

Synchronization signals may be derived from communication signals between analyzer 202 and sampler 216. For example, because analyzer 202 and sampler 216 is in communication with one another, clock signals embedded in the communication are used for synchronization. In some embodiments, synchronization signals are transmitted via a spare pin of networking cable 238 between analyzer 202 and sampler 216.

In some embodiments, the synchronization is performed using wireless communication signals. For example, the clock signals in synchronization are global positioning system (GPS) clock data, where the GPS clock data are received by interferometer module 206, sampler 216, and analyzer computing device 230 and are used to synchronize interferometer electronic board 214 with controller 228. In another example, analyzer 202 and sampler 216 communicate with one another via wireless communication, such as wireless LAN. The clock signals are transmitted wirelessly between analyzer 202 and sampler 216 and used in synchronization.

In the example embodiments, the communication signals may be in a precision time protocol (PTP), such as standard IEEE 1588. The protocol is used to synchronize clocks among different devices or systems at different locations in a computer network. PTP may be used in wired communication such as through networking cable 238, or in wireless communication such as via a wireless LAN. Communication signals including clock signals in PTP may be transmitted among analyzer computing device 230, interferometer electronic board 214, and controller 228. For example, clock signals generated by analyzer computing device 230 serve as master clock signals and are embedded in communication from analyzer computing device 230 to interferometer electronic board 214 and controller 228. Alternatively or additionally, clock signals from interferometer electronic board 214 or controller 228 may serve as master clock signals. The signals communicated from interface module 226 are embedded with clock signals provided by controller 228. The clock signals from sampler 216 are compared with clock signals provided by analyzer 202 and used to synchronize digitization of the detected signals with the positions of the sliding mirror in interferometer 212.

In some embodiments, a synchronization cable 116 (see FIG. 1) is used for synchronization. The synchronization cable 116 is coupled between interferometer module 206 and optical detector 222. Synchronization cable 116 may be relatively long to cover the distance from analyzer 202 to sampler 216.

Figure 3:
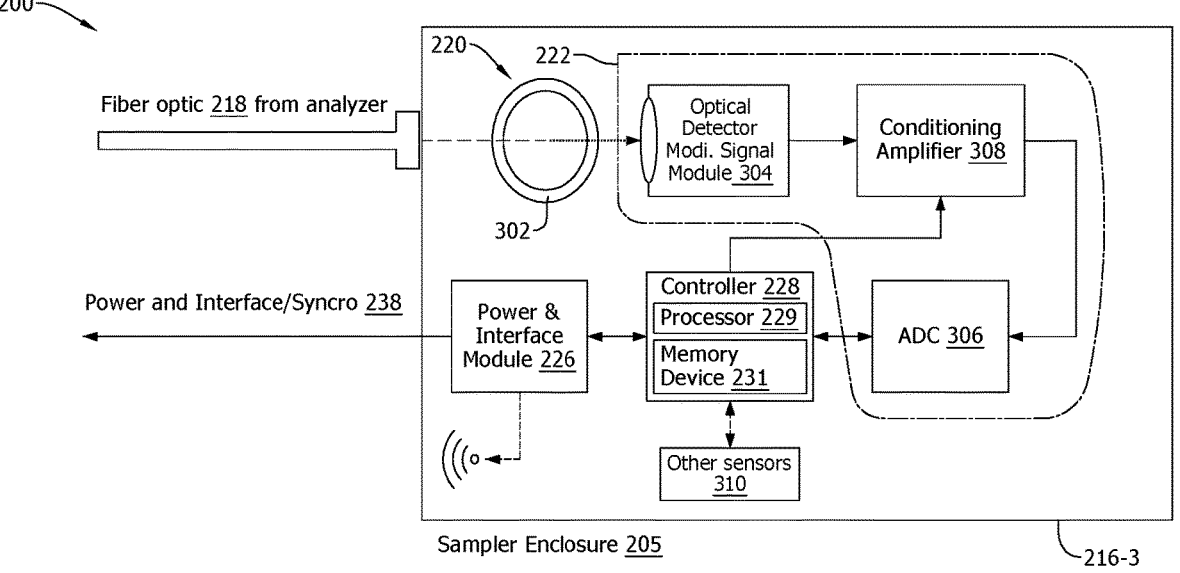
FIG. 3 is a schematic diagram of an example sampler of the spectrometer system shown in FIG. 2.

FIG. 3 is a schematic diagram of an example sampler 216-3. In the example embodiment, sampler 216 includes a sampling module 220. Sampling module 220 may include a tubing 302 that carries a sample therethrough. Tubing may be a length of tube or conduit of a processing line in a plant. Tubing 302 is fabricated from a light transmitting material to avoid light modification by tubing 302. In some embodiments, sampling module 220 is a chemical bath (not shown) including chemical fluid, which is gaseous and/or liquid. Modulated light from interferometer 212 (see FIG. 2) is transmitted to sampler 216 via fiber optic cable 218 and emitted toward the sample contained in sampling module 220.

In the example embodiment, sampler 216 further includes optical detector 222. Optical detector 222 includes optical detector signal module 304 that is configured to convert optical signals to electrical signals. Optical detector signal module 304 may include devices configured to convert light into electrical signals, such as PIN photodiodes and/or pyroelectric IR sensors like deuterated L-alanine doped triglycine sulphate (DLATG) detectors. Optical detector 222 may further include an analog to digital converter (ADC) 306 configured to digitize analog electrical signals into digital electrical signals. In some embodiments, ADC 306 may be integrated in controller 228. Optical detector 222 may further include a conditioning amplifier 308. Conditioning amplifier 308 is configured to amplify the electrical signals detected by optical detector signal module 304. The operation of conditioning amplifier 308 may be turned on or off based on whether a certain condition is met. For example, if the signals are below a threshold, the signals are amplified, while if the signals are at or above the threshold, the signals are not amplified. As a result, the range of the signals output from conditioning amplifier 308 is optimal for ADC 306 in digitization.

In the example embodiment, sampler 216 further includes controller 228 configured to control operation of sampler 216. Controller 228 is in communication with conditioning amplifier 308, ADC 306, interface module 226, and/or other sensors 310 and configured to control operation of components of sampler 216. Other sensors 310 such as a temperature sensor and/or a GPS sensor may be included in sampler 216 for compensation purposes or synchronization between interferometer 212 and data acquisition in optical detector 222. Controls are transmitted from controller 228 to other components. Signals and data may be transmitted between controller 228 and other components.

In the example embodiment, sampler 216 further include interface module 226. Interface module 226 may include a network interface. Interface module 226 may be configured to communicate with other devices and receive power from an external power source, thereby facilitating power, data, and synchronization signals being transmitted to and/or from interface module 226. Interface module 226 is coupled with another device via one or more networking cables 238. Networking cable 238 may transmit power, communication, and/or synchronization signals. Networking cables 238 may include a PoE cable or a cable that meets the Ethernet APL standards. In some embodiments, power is transmitted separately from signals, where power and signals are transmitted via different cables or channels. In other embodiments, sampler 216 may include an internal power source such as one or more batteries (not shown), configured to supply power to sampler 216. Data may be transmitted to and from sampler 216 via wired communication such as via networking cable 238, wireless communication such as via wireless LAN, or a combination of both. Synchronization may be transmitted via wired and/or wireless communication. Synchronization signals may be in PTP protocols, via wired or wireless communication. In some embodiments, synchronization signals include GPS signals.

Figure 4:
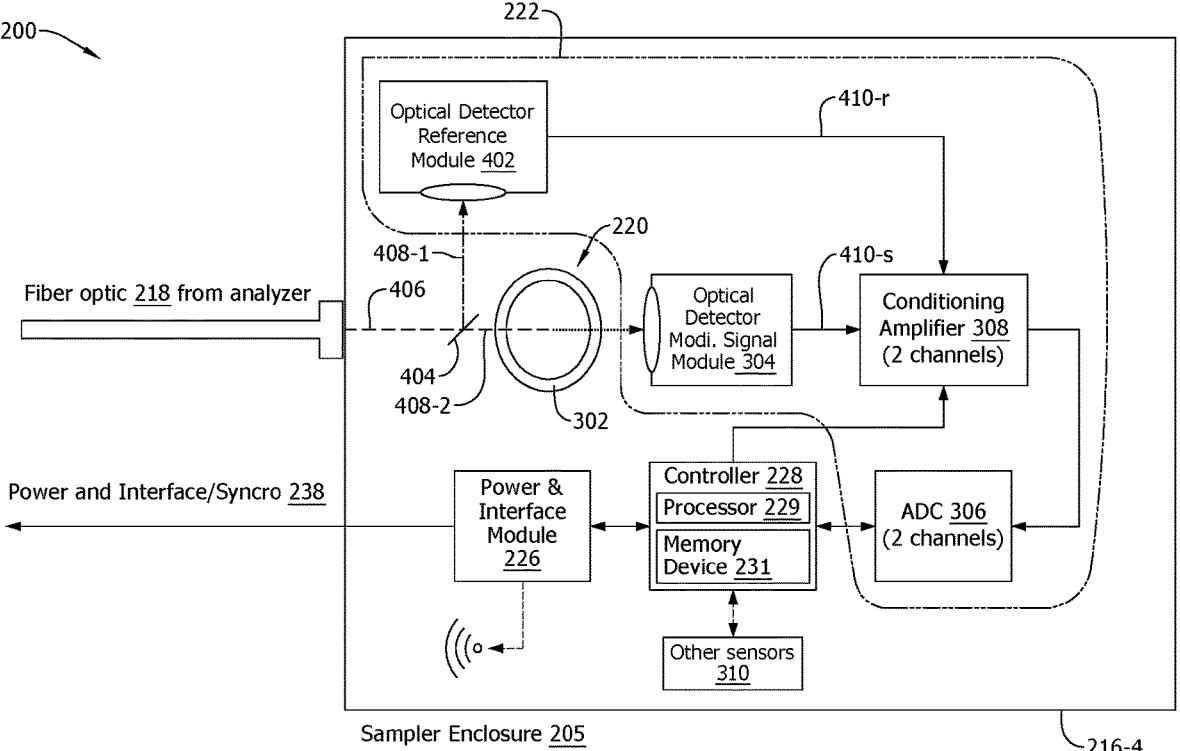
FIG. 4 is a schematic diagram of another example sampler of the spectrometer system shown in FIG. 2.

FIG. 4 is a schematic diagram of another example sampler 216-4. Compared to sampler 216-3 shown in FIG. 3, sampler 216-4 further includes an optical detector reference module 402 in optical detector 222. In the example embodiment, optical detector reference module 402 is positioned at a different optical path from sampling module 220. Like optical detector signal module 304, optical detector reference module 402 includes photodetectors configured to convert light into electrical signals. Light modulated by interferometer 212 travels from interferometer 212, along optical fibers in fiber optic cable 218, and to sampler 216. Due to factors such as temperature changes, fiber bending, optic vibration, and/or other factors, noise is introduced by optical fibers in fiber optic cable 218 into light received by sampler 216. Fiber optic cable 218 may span a relatively long distance, such as several hundred meters or farther. Noise from travelling the relatively long distance of optical fibers may significantly deteriorate the detected signals, causing reduction in the accuracy of measurements by sampler 216.

In the example embodiment, sampler 216 may include a splitter 404 that split light 406 modulated by interferometer 212 and transmitted over fiber optic cable 218 into two groups 408 of rays. The light intensity of first group 408-1 and second group 408-2 may be the same or in a known proportion with one another. First group 408-1 of rays travel toward optical detector reference module 402. Second group 408-2 of rays travel toward sampling module 220. The frequency information in optical signals of groups 408-1, 408-2 of rays are the same or approximately the same, where light in the groups 408-1, 408-2 is modulated by interferometer 212 in the same manner. First group 408-1 is detected by optical detector reference module 402. Second group 408-2 travels through sampling module 220 and is modified by the sample. The modified second group of rays are detected by optical detector signal module 304. Optical detector reference module 402 and optical detector signal module 304 are both configured to convert incoming light into electrical signals. Conditioning amplifier 308 and ADC 306 may include two channels, where one channel is for processing output signals 410-r from optical detector reference module 402 and the other channel is for processing output signals 410-s from optical detector signal module 304.

In the example embodiment, the output signals 410-r from optical detector reference module 402 include reference signals, which are optical signals before being modified by the sample. The output signals 410-s from optical detector signal module 304 include modified signals, which are optical signals modified by the sample. Accordingly, the differences between the two output signals 410-r, 410-s represent the optical signals modified by the sample, with noise introduced by optical fibers in fiber optic cable 218 being reduced or removed. Accordingly, accuracy of measurements by spectrometer system 200 and sampler 216 is increased.

Figure 5:
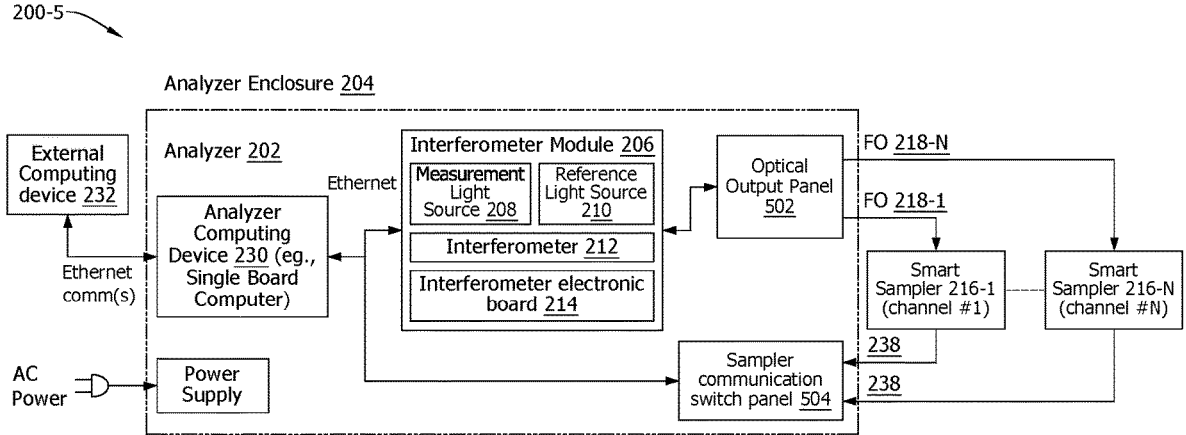
FIG. 5 is a schematic diagram of another example spectrometer system.

FIG. 5 is a schematic diagram of another example spectrometer system 200-5. In the example embodiment, spectrometer system 200-5 includes a plurality of samplers 216. Analyzer 202 further includes an optical output panel 502. Optical output panel 502 may include a plurality of outlets each sized to receive a fiber optic cable 218. Modulated light by interferometer 212 is provided to samples via fiber optic cables 218. For example, N number of samplers 216-1, . . . , 216-N are included in spectrometer system 200. N number of fiber optic cables 218-1, . . . , 218-N are also included, each fiber optic cable 218 being connected to a corresponding sampler 216. The detected signals by samplers 216 are transmitted to analyzer 202 for further processing. Analyzer 202 further includes a sampler communication switch panel 504, which includes a plurality of outlets each sized to receive a networking cable 238. In some embodiments, communication between analyzer 202 and samplers 216 is wireless, where each sampler 216 may communicate with analyzer 202 in a specific wireless channel. In other embodiments, communication between analyzer 202 and samplers 216 is a combination of wired and wireless communication, where a given sampler 216 may communicate with analyzer 202 in a wired or wireless mode.

Synchronization between analyzer 202 and sampler 216 is provided by synchronizing analyzer computing device 230, interferometer module 206, and controllers 228 in samplers 216. For example, clock signals are communicated among analyzer computing device 230, interferometer electronic board 214, and controllers 228, and are used to synchronize interferometer 212 with samplers 216.

In at least some known spectrometer systems, the analyzer is equipped with a fixed number of detector modules. A sampler is added or removed from the spectrometer system by connecting the interferometer with each of the samplers via a fiber optic cable and connecting each of the samplers with one of the outlets for the detector modules via another fiber optic cable. A number of detection modules are often unused, reducing the utility of the analyzer. Further, a user needs to choose an analyzer that has a number of detection modules being the same as or greater than the number of samplers, which often is unknown in advance or may change during operation, causing inconvenience or production delays to the user.

In contrast, spectrometer system 200-5 is flexible in the configuration while fully using the components in the system. Any number of samplers that is the same as or less than the number of outlets in analyzer 202 may be included in spectrometer system 200-5. To add or remove a sampler 216, the sampler 216 is plugged into or removed from analyzer 202 by connecting or disconnecting fiber optic cable 218 and communication with the sampler 216.

Figure 6:
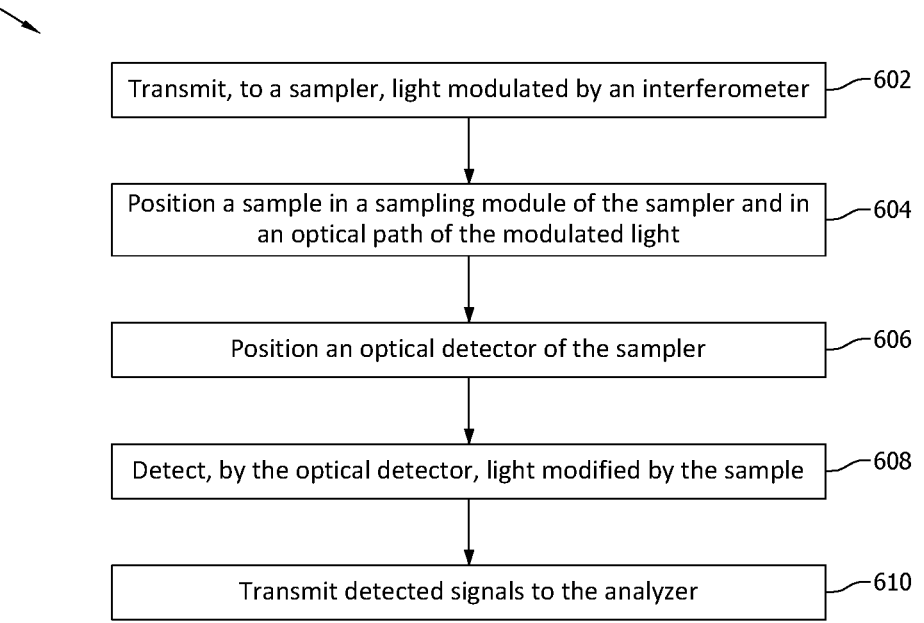
FIG. 6 is a flow chart of an example method of remote data acquisition using the spectrometer systems shown in FIGS. 2-5.

FIG. 6 is a flow chart of an example method 600 of remotely acquiring data using a spectrometer system for detecting chemical compositions of a sample. In the example embodiment, method 600 includes transmitting 602, to a sampler, light modulated by an interferometer of an analyzer in a spectrometer system. Example spectrometer systems, analyzers, and samplers are spectrometer systems 200, analyzers 202, and samplers 216 described herein. Sampler 216 is positioned remotely from analyzer 202. Method 600 also includes positioning 604 a sample in a sampling module of the sampler and in an optical path of the modulated light. Method 600 further includes positioning 606 an optical detector of the sampler adjacent to the sampling module and in an optical path of light exiting from the sampling module. In addition, method 600 includes detecting 608, by the optical detector, light modified by the sample. Further, method 600 includes transmitting 610, via an interface module of the sampler, detected signals to the analyzer.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), an application specific integrated circuit (ASIC), field programmable gate arrays (FPGA), and other programmable circuits, and these terms are used interchangeably herein. In the embodiments described herein, "memory" may include, but is not limited to, a computer-readable medium, such as a random-access memory (RAM), a computer-readable nonvolatile medium, such as a flash memory. Alternatively, a floppy disk, a compact disc-read only memory (CD-ROM), a magneto-optical disk (MOD), and/or a digital versatile disc (DVD), and/or other optical media storage devices may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a programmable logic controller (PLC), a field programmable gate array (FPGA), a digital signal processing (DSP) device, and/or any other circuit or processing device capable of executing the functions described herein. The methods disclosed herein may be encoded as executable instructions embodied in a computer readable medium, including, without limitation, a storage device and/or a memory device. Such instructions, when executed by a processing device, cause the processing device to perform at least a portion of the methods disclosed herein. The above examples are not intended to limit in any way the definition and/or meaning of the term processor and processing device.

At least one technical effect of the systems and methods described herein includes (a) reducing costs and increasing accuracy of measurements by positioning an optical detector adjacent to a sampling module in a sampler; (b) increasing accuracy of measurements by including an optical detector reference module to reduce noise caused by a fiber optic cable used for transmitting modulated light to the sampler; and (c) eliminating a separate synchronization cable between an interferometer and a detection module by synchronizing the interferometer with the optical detectors via software.

Example embodiments of spectrometer systems and methods are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional examples that also incorporate the recited features. Further, to the extent that terms "includes," "including," "has," "contains," and variants thereof are used herein, such terms are intended to be inclusive in a manner similar to the term "comprises" as an open transition word without precluding any additional or other elements.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A spectrometer system for remote data acquisition in detecting chemical compositions of a sample, the spectrometer system comprising:
    an analyzer enclosure that includes an analyzer, the analyzer comprising:
        an interferometer module comprising:
            a measurement light source configured to emit light for measurements of the sample;

a reference light source configured to emit light having a monochromatic spectrum;
            an interferometer configured to receive the light emitted by the measurement light source and the reference light source, and to modulate the light; and
        a sampler communication switch panel configured to receive electronic signals; and
    a sampler enclosure that includes a sampler, the sampler enclosure positioned remotely from the analyzer enclosure and connected with the interferometer via a fiber optic cable, the fiber optic cable configured to transmit the modulated light from the interferometer to the sampler enclosure, the sampler comprising:
        a sampling module configured to receive the sample and to position the sample in an optical path of the modulated light;
        an optical detector positioned adjacent to the sampling module, the optical detector configured to detect modified light by the sample; and
        an interface module configured to electronically transmit detected signals by the optical detector to the analyzer via the sampler communication switch panel.

2. The spectrometer system of claim 1, wherein the sampler further comprises:
    an optical detector reference module positioned in a different optical path of the modulated light from the sampling module and configured to detect the modulated light before being modified by the sample.

3. The spectrometer system of claim 2, wherein the sampler further comprises:
    a controller configured to remove noise caused by the fiber optic cable based on reference signals detected by the optical detector reference module.

4. The spectrometer system of claim 1, wherein the interferometer and the optical detector are synchronized via synchronization signals based on clock signals.

5. The spectrometer system of claim 4, wherein the synchronization signals are in a precision time protocol (PTP).

6. The spectrometer system of claim 4, wherein the clock signals comprise global positioning system (GPS) clock data.

7. The spectrometer system of claim 4, further comprising a networking cable coupled with the interface module and the sampler communication switch panel, wherein the network cable is configured to transmit the synchronization signals.

8. The spectrometer system of claim 1, comprising a plurality of sampler enclosures, wherein each of the plurality of sampler enclosures is coupled with the analyzer enclosure via a fiber optic cable and is configured to electronically transmit signals detected by an optical detector to the sampler communication switch panel of the analyzer.

9. The spectrometer system of claim 1, further comprising a networking cable configured to transmit electric power and digital signals.

10. The spectrometer system of claim 9, wherein the networking cable is configured to be used in a hazardous environment.

11. A method of remotely acquiring data using a spectrometer system for detecting chemical compositions of a sample, the spectrometer system comprising an analyzer enclosure that includes an analyzer and a sampler enclosure that includes a sampler, the analyzer comprising a measurement light source, a reference light source, an interferometer, and a sampler communication switch panel, the sampler comprising a sampling module, an optical detector, and an interface module, the method comprising:

emitting, by the measurement light source, light for measurement of the sample;

emitting, by the reference light source, light having a monochromatic spectrum;

receiving, by the interferometer, the light emitted by the measurement light source and the reference light source;

modulating, by the interferometer, the received light;

transmitting, to the sampler via a fiber optic cable, the light modulated by the interferometer;

positioning the sample in the sampling module and in an optical path of the modulated light;

detecting, by the optical detector, light modified by the sample; and electronically transmitting, via the interface module of the sampler, detected signals to the analyzer via the sampler communication switch panel.

12. The method of claim 11, further comprising:

positioning an optical detector reference module in a different optical path of the modulated light from the sampling module; and splitting the modulated light transmitted from the interferometer into a first group of rays and a second group of rays, wherein the first group of rays travel toward the optical detector reference module, and the second group of rays travel toward the sampling module.

13. The method of claim 12, further comprising:

removing noise caused by the fiber optic cable based on reference signals detected by the optical detector reference module.

14. The method of claim 11, wherein detecting the light further comprises:

synchronizing the interferometer and the optical detector via synchronization signals based on clock signals.

15. The method of claim 14, wherein the synchronization signals are in a precision time protocol (PTP).

16. The method of claim 14, wherein the clock signals include global positioning system (GPS) clock data.

17. The method of claim 11, wherein electronically transmitting the detected signals further comprises:

electronically transmitting, via a networking cable electrically coupled to the interface module and the sampler communication switch panel, the detected signals to the analyzer.

18. The method of claim 17, wherein the networking cable is configured to transmit electric power and digital signals.

19. A spectrometer system for detecting chemical compositions of a sample, the spectrometer system comprising:

a sampler enclosure that includes a sampler, the sampler enclosure connected with an interferometer of an external analyzer via a fiber optic cable, the fiber optic cable configured to transmit modulated light from the interferometer to the sampler enclosure, the sampler comprising:

a sampling module configured to receive the sample and to position the sample in an optical path of the modulated light;

an optical detector positioned adjacent to the sampling module, the optical detector configured to detect modified light by the sample; and an interface module configured to electronically transmit detected signals by the optical detector to the external analyzer.

20. The sampler of claim 19, wherein the sampler further comprises an optical detector reference module positioned in a different optical path of the modulated light from the sampling module.

* * * * *